US012168815B2

(12) United States Patent
Osborne

(10) Patent No.: US 12,168,815 B2
(45) Date of Patent: Dec. 17, 2024

(54) PROCESSING SYSTEMS AND METHODS FOR STEEL-MAKING CO-PRODUCTS

(71) Applicant: Phoenix Services LLC, Radnor, PA (US)

(72) Inventor: Bryan Osborne, Radnor, PA (US)

(73) Assignee: Phoenix Services LLC, Radnor, PA (US)

( * ) Notice: Subject to any disclaimer, the term of this patent is extended or adjusted under 35 U.S.C. 154(b) by 807 days.

(21) Appl. No.: 17/199,038

(22) Filed: Mar. 11, 2021

(65) Prior Publication Data

US 2022/0290271 A1 Sep. 15, 2022

(51) Int. Cl.

| | |
|---|---|
| ***C22B 7/00*** | (2006.01) |
| ***B66C 1/06*** | (2006.01) |
| ***B66C 3/02*** | (2006.01) |
| ***B66C 13/48*** | (2006.01) |
| ***C22B 7/04*** | (2006.01) |

(52) U.S. Cl.

CPC ................ *C22B 7/005* (2013.01); *B66C 1/06* (2013.01); *B66C 3/02* (2013.01); *B66C 13/48* (2013.01); *C22B 7/04* (2013.01)

(58) Field of Classification Search

CPC .... B66C 1/68; B66C 1/06; B66C 3/02; B66C 13/46; B66C 13/48; B66C 23/14; C22B 7/005; C22B 7/04

See application file for complete search history.

(56) References Cited

U.S. PATENT DOCUMENTS 3,799,602 A * 3/1974 Laws ........................ B66C 1/06 414/737
4,253,706 A * 3/1981 Hay ........................ B02C 19/00 173/124
7,896,178 B2 * 3/2011 Davis .................... B66C 23/365 212/196
7,935,302 B1 * 5/2011 Groteke .................. F27B 14/02 266/205
2009/0206589 A1 * 8/2009 Osswald ................ B62D 21/14 187/234
2013/0123030 A1 * 5/2013 Jacobi .................... A63G 31/00 472/30
2023/0278475 A1 * 9/2023 Steffens ................... B60N 2/77 180/334

FOREIGN PATENT DOCUMENTS

AT 410786 B * 6/2003 ............. B66C 13/12
CN 201596525 U * 10/2010 ............... B02C 1/00
CN 112111648 A * 12/2020 ........... C21D 9/0081

* cited by examiner

*Primary Examiner* — Emmanuel M Marcelo
(74) *Attorney, Agent, or Firm* — Wiggin and Dana LLP

(57) ABSTRACT

A system and method for handling slag in a slag pit includes an equilibrium or balance crane equipped with a quick connect coupling. A drop-ball fixture and drop-ball reduces the size of the slag, as needed, then the boom assembly of the crane releases the drop-ball fixture and engages an excavating tool, such as a clamshell bucket, a bucket, or a grapple. An elevated control station provides an operator with improved line-of-sight visibility.

14 Claims, 4 Drawing Sheets

PROCESSING SYSTEMS AND METHODS FOR STEEL-MAKING CO-PRODUCTS

BACKGROUND

The invention relates generally to processing co-products of metallurgical smelting, and more particular to systems and methods for processing scrap and/or slag from steel processing.

Steel processing produces large quantities of slag as a co-product. Slag is the collection of compounds removed from molten metal as impurities after the materials (including raw ore and additives) are heated to a high temperature.

Slag usually contains valuable metals and other materials that are often referred to as aggregates. A significant part of the valuable portion within slag can be recovered to be reused during the steelmaking process—for example, as furnace and converter lining—or sold for use by other industries—for example, as soil fertilizer, waste water treatment media or additive, and paving product or additive for roads and highways.

Slag of the type that is handled and recovered often comes from three primary forms: Iron making slag from a blast furnace (BF), steel-making slag from a basic oxygen furnace (BOF), and steel-making slag from an electric arc furnace (EAF). Slag material can come from an iron & steel makers furnace in a slurry-like form, typically at high temperature (such as 900 F or more), then cooled for further handling and processing. The term "steel making" relating to scrap and/or slag as used herein refers to any of the processes described above, and the like.

The process of recovering slag for its commercial value starts with handling and transporting large quantities of molten slag in large containers, called "slag pots." Large rubber-tired hauling equipment, called "pot carriers," carry the slag pots, often for miles. The pot carriers then roll out or dump out the molten slag into a "pit"—that is, into or on to the ground.

The molten slag in the slag pit may air-cool or the slag may be dug from the slag pit and transported to a quenching station for water cooling. Applying water to molten slag is a dangerous process, as explosions may occur or other personnel hazards may occur. Large rubber-tired loaders (for example, CAT 988 wheel loaders) are typically used to dig-up and transport the slag to a material recovery plant ("MRP") at which the aggregates are separated from the metallic components. Pot carriers and loaders are well known in the slag recovery industry.

Steel-making has a loss of yield, such as edges trimmed from a coiling process, ends cut from a billet or slab, irregularities or waste during casting, scale on hot products, out-of-spec products, molten material poured (or otherwise removed) during removal of slag, and the like. The term scrap is used herein to refer to the loss-of-yield/recycled stream from steel-making from the above or any other sources. Thus, scrap is considered herein to be a co-product of steel-making. Typically, scrap has at least one dimension that requires reducing before processing it, such as introducing it into a furnace. Often a cable crane is employed to break large pieces of scrap into manageable sizes by lifting a large weight, then dropping the weight onto the scrap—referred to as "drop-balling."

In drop-balling, an electromagnet is affixed to the cable crane assembly. The electromagnet lifts the large drop-ball, then the crane operator positions the drop-ball over the scrap by eye, and then releases the drop ball to fall onto the scrap. Drop-balling continues until the operator determines that the scrap is reduced to the desired sizes, such as a size that can be lifted and transported by loaders or haul trucks, and/or is appropriate for introducing in to furnace. Typically, a loader will pick up and haul the scrap after the drop-balling process. Often a material handler (such as a Case CX290D Material Handler) may be employed. Common sizes of scrap include 36"×36", 8"×36", 4"×8", 3"×5", 3"×1" & 1" to zero.

FIG. 7 (Prior Art) is a schematic view of an example of a conventional, general purpose crane assembly 110 of a type that may be used for drop-balling when fitted with an electromagnet. Crane assembly 110 is illustrated as mounted on a truck 120 for support and transport. Outriggers 122 stabilize crane assembly 110 during operation. A slewing platform 126, which is supported by the bed on truck 120, includes a counterweight 130 and a winding drum 132 (not shown in FIG. 7 as they are internal to slewing platform 126). Platform 126 is able to rotate on truck 120 such that assembly 110 can be positioned as needed.

A boom assembly 140 extends from and is supported by slewing platform 126. Boom assembly 140 includes a latticed boom 142, a strut 146, a hoist cable 150, and sheaves 154 and 148. Boom 142 is a rigid structure that has a lower end supported by platform 126. The lower end is pivoted about a horizontal axis such that the upper end of boom 142 can be raised and lowered. Strut 146 extends outwardly from boom 142. Cable 150 is wound around drum 132 and extends over strut 146 to the upper end of boom 142, over upper sheave 154 to lower sheave 158, which often includes a hook or other device.

In operation, truck 120 is moved to a desired location, outriggers 122 engage the ground to stabilize the system, and an operator in or around platform 126 positions the boom 142 by rotating platform 126 and rotating drum 132 such that the hook is positioned as desired. Lower sheave 158 (if any) is controlled such that the hook is lowered to the ground to engage a target object.

SUMMARY

The technology is directed to unique problems in the large-scale processing of co-products—slag and scrap—steel-making. Conventional scrap processing requires numerous large-scale machines, each having a specific purpose. For example, slag processing, after the slag is dumped into a slag pit, typically uses a loader and/or a material handler, and a dump truck or haul truck, as generally described above. Scrap processing typically uses a cable crane and drop-ball assembly to reduce the size of the scrap and uses a grapple for grasping the scrap. The drawbacks of the conventional technology include airborne dust and dirt debris, risk of large spills or contamination due to storage of fuels, oils, lubricants and other chemicals needed to support multiple pieces of fossil fuel powered heavy equipment, and environmental and personnel safety related issues.

Accordingly, an aspect of the technology disclosed herein is capable of handling scrap and/or slag from steel making. In this regard, after the slag is dumped into a pit, a single system is capable of digging and lifting the slag to move it or dump it for further transport or processing. The same system is capable of breaking the scrap to reduce its size.

According one aspect of the disclosure, a system for handling and processing slag and/or scrap from steel-making includes a cableless crane assembly, end tools that can be affixed to and removed from a working or distal end of the cableless crane assembly, and a quick-connect device adapted for selectively interchanging the end tools with the crane assembly. The end tools can include a drop-ball tool and at least one other tool adapted for digging slag from the slag pit and/or grasping the scrap; and a quick-connect device adapted for selectively interchanging the end tools with the crane assembly. Thus, the crane assembly and quick connect device are adapted for reducing capital equipment, enhancing environmental advantages, and improving operator safety compared with prior art systems for system for handling and processing slag and/or scrap from steel-making.

According to another aspect of the present disclosure, a system for handling and processing steel slag and/or steel scrap includes: a support base; an equilibrium-type crane assembly supported by the support base; and a quick-connect adapter located at a distal end of the crane assembly; and end-tools that include at least a drop-ball tool and an other end tool that is adapted for at least one of digging slag from a slag pit and grasping scrap. The equilibrium-type crane assembly includes: a boom that is supported by and pivotable on a main support pivot, the boom including a first pivot at a proximal end thereof and a second pivot at a distal end thereof; an upper linkage arm including a third pivot at a proximal end thereof and a fourth pivot at a distal end thereof; a stick that is connected to the upper linkage arm at the fourth pivot at a proximal end of the stick and is connected to the distal end of the boom at the second pivot; a proximal linkage arm that is connected to the boom at the first pivot and that is connected to the upper linkage arm at the third pivot; the stick, the upper linkage arm, the proximal linkage arm, and a portion of the boom forming a four-bar linkage; and an actuator system adapted for manipulating the four bar linkage in response to control signals. Preferably, the actuator system is hydraulic system including a hydraulic fluid pumping system and actuator cylinders that are driven by hydraulic pressure from the pumping system. The quick connect coupling is adapted for releasing any one of the end-tools from the crane assembly and coupling another one of the end-tools with the crane assembly.

The proximal linkage arm may be integral with a counterweight. The end-tool can be one or more of a clamshell bucket, a bucket, or a grapple. The base can be any one of a pedestal, rails, a crawler, and a barge. The drop-ball tool can be a magnet adapted for selectively lifting a drop-ball and, upon reaching a desired height, disengaging the drop-ball from the magnet to enable the drop-ball to fall by gravity on to the scrap and/or slag. The quick-connect adapter may be a hydraulic quick connect adapter.

The system for handling and processing steel slag and/or steel scrap can also include an operator control station that is supported by the support base and elevated from the ground to enhance visibility by an operator of the operations of the system. Controls for the system may a controller adapted for automatically returning the drop ball tool to a predetermined position, referred to as a “return-to-drop” feature, relative to a prior position of release of the drop-ball.

In some another aspect of the present disclosure, the quick-connect coupling is optional. Accordingly, a method of handling co-products of steel-making, including slag and/or scrap, includes the steps of: (a) positioning a cableless crane assembly proximate a slag pit; (b) actuating an end-tool and thereby digging slag from the slag pit; (c) after the steps of actuating the end-tool and the step (b) of digging the slag, depositing the slag at a desired location; (d) lifting a drop-ball coupled by the crane assembly and positioning the drop-ball over scrap; (e) after the step (d) of lifting the drop-ball, releasing the drop-ball from the crane assembly from a drop position such that the drop-ball falls onto the scrap to produce a reduced-size portion of the scrap; and (f) after the step (e) of releasing the drop-ball, moving the crane assembly to re-engage the drop-ball with the crane assembly and lifting the drop-ball. The method may also include the step of engaging a controller to position the drop-ball at or near a desired drop position and then releasing the drop-ball from the crane assembly (that is, performing the return-to-drop step) such that the drop-ball is returned to or approximately to the x-y coordinates (that is, defined on the ground, where z is the vertical) of the prior drop coordinates. The return-to-drop location may also be at the same or approximately the same height (in the z direction) as the prior drop position.

The above steps may be performed by employing a grapple. For example, the step (b) of digging the slag pit may include grasping the slag with a grapple; the step (d) of lifting the drop ball may include closing fingers of the grapple to grasp the drop ball, and the step (e) of releasing the drop ball may include opening the fingers of the grapple to enable the releasing of the drop ball. In this regard, the drop-balling process may be performed at least partly without an electromagnet. And/or the drop-balling process may be performed by employing the step (d) of lifting the drop ball by energizing an electromagnet releasably affixed to a stick of the crane assembly, and wherein the step of releasing the drop-ball includes releasing the drop ball from the electromagnet.

Further, the method can include the step of selectively releasing and engaging the end tool and the electromagnet with a quick-connect adapter connected to the stick of the crane assembly. Selectively releasing and engaging the end tool can include the steps of: positioning the end-tool on or near the ground and releasing the end-tool from the distal end of the stick of the crane assembly; and after the positioning and releasing steps, moving the crane assembly such that the quick connect adapter engages an electromagnet. And the step (a) of positioning a cableless crane assembly proximate a slag pit and the step (b) of actuating an end-tool include actuating a four-bar linkage of the crane assembly and activating a pair of hydraulic cylinders to move the four-bar linkage.

The step (a) of positioning the crane can include moving the crane assembly over the ground by one of a crawler and a rail and carriage system, and/or the step (a) of digging the pit can include employing one of a clamshell bucket, a bucket, and a grapple.

This section provides several aspects of the present disclosure. The present invention is not intended to be limited to the aspects set out herein.

DETAILED DESCRIPTION OF ILLUSTRATIVE EMBODIMENTS

Figure 1:
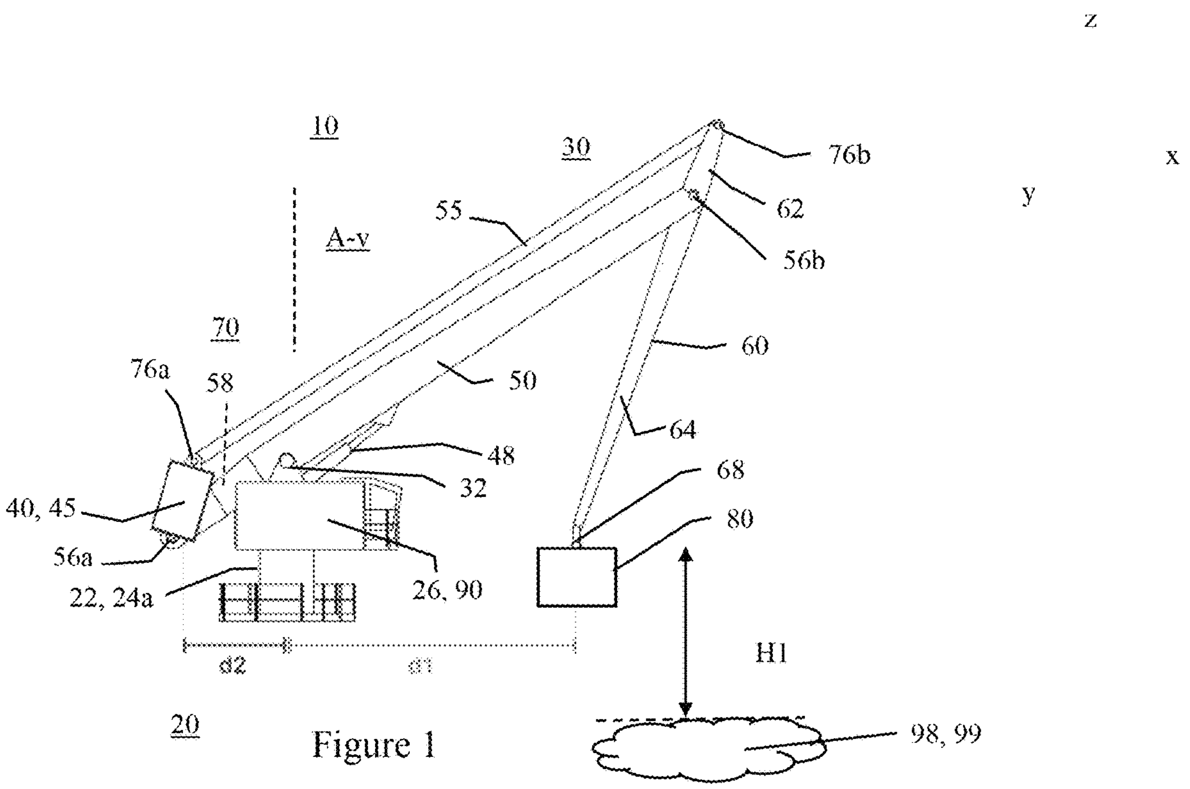
FIG. 1 is a partially schematic view of a crane assembly that may be employed in slag handling, showing a boom assembly in a partially retracted position.
Figure 2:
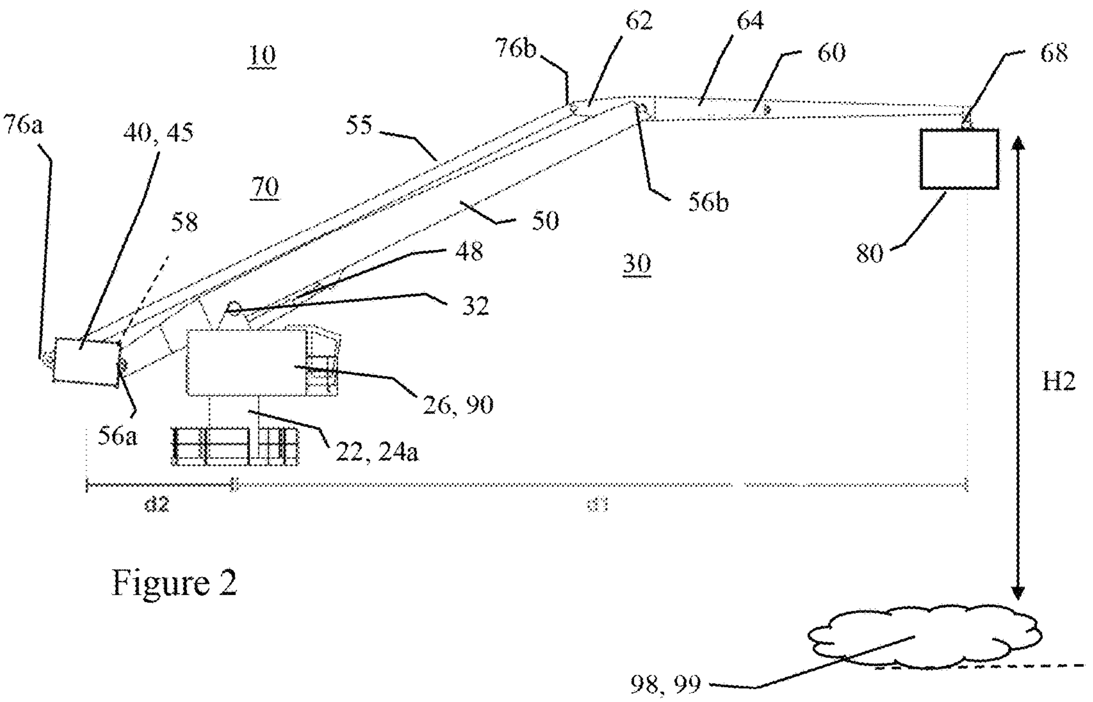
FIG. 2 is another view of the crane assembly of FIG. 1, showing the boom assembly in a partially extended and elevated position.

Referring to FIGS. 1 and 2 for illustration, a crane system 10 is an equilibrium or balance-type crane that includes a support base assembly 20 and a boom assembly 30. Base 20 includes a support unit 22 and (optionally) an operator or control station 26. Support unit 22 is illustrated in FIGS. 1 and 2 as a pedestal 24*a* fixed in the ground by conventional means, such as attached to a foundation built to support the weight of crane 10 and any operational load. Crane system 10 is an example of a "cableless crane," which term excludes cable-cranes but broadly includes other industrial machinery performing a crane-like function, such as a material handler, as that term is understood by persons familiar with scrap handling technology.

Figure 3A:
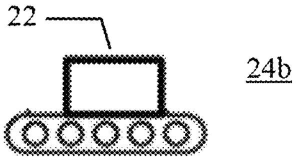
FIG. 3A is a schematic view illustrating a first embodiment of a moveable support for the crane assembly.
Figure 3B:
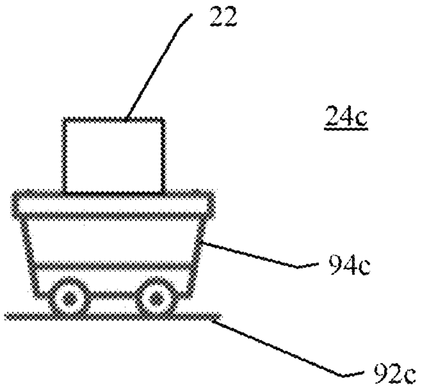
FIG. 3B is a schematic view illustrating a second embodiment of a moveable support for the crane assembly.

Other support units may be employed, such as a crawler or like tracked machine 24*b* (schematically illustrated in FIG. 3A), a rail and carriage system 24*c* (schematically illustrated in FIG. 3B) that includes a track or rails 92*c* that carry a moveable carriage 94*c*, or other means for moving crane 10. Crawler 24*b* and/or carriage 24*c* can carry a support unit 22 and boom assembly 30. Other bases or carriers for a boom assembly 30 may be employed, such as a barge and the like. Preferably, control station 26 is elevated, and more preferably a control station may be located near the topmost point of pedestal 24*a* (or otherwise as high as conveniently feasible for crawler 24*b* and carriage 24*c*) to enhance an operator's line-of-sight visibility of the operation of the boom assembly 30 and to enhance safety for an operator.

Referring again to FIGS. 1 and 2, boom assembly 30 includes a counterweight 40, a boom 50, a linkage arm 55, a stick 60, and a end tool 80. Boom 50 is connected to support base assembly 20 by a main pivot support 32 such that (i) boom 50 can pivot about a vertical axis A-V to turn boom assembly 30 about base 20 and such that (ii) boom 50 can pivot about a horizontal axis (not identified in the figures) such that boom assembly 30 can raise and lower a load. In this regard, a lower actuator, such as hydraulic cylinder 48, is connected between boom 50 and a fixed portion of support base 20. Thus, lower cylinder 48 is thus positioned to pivot boom 50 about pivot 36 as part of the operation of boom assembly 30, as explained more fully below.

Linkage arm 55 extends approximately the same length as boom 50, although any particular length of linkage arm 55 or relationship to the length of boom 50 is not required. A proximal end of linkage arm 55 is operatively coupled (though preferably not directly coupled) to a proximal end of boom 50, as a proximal linkage arm 45 spans between the proximal end of boom 50 and the proximal end of linkage arm 55.

Figure 4:
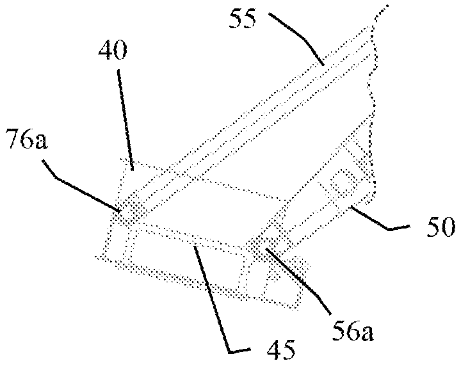
FIG. 4 is an elevation view of a portion of the crane assembly of FIG. 1 with portions transparent to show an embodiment of the proximal arm and counterweight.

In the embodiment of the figures, proximal linkage 45 is formed by a portion of counterweight 40, as illustrated schematically in FIGS. 1, 2, and 4. FIG. 4 is shown partially transparent to illustrate the structure of linkage 45. Other configurations for operatively coupling linkage 45 with boom 50—while providing a counterweight 40 that is not integral with linkage 45—may be employed, as will be understood by persons familiar with equilibrium crane structure and function.

Stick 60 is attached to the distal end of boom 50 at a point on the upper boom arm that is between the proximal and distal ends of stick 60, as explained more fully below. In the embodiment of FIGS. 1 and 2, stick 60 includes a connector or adapter 68 that is affixed to the distal end of stick 60 and that is capable of releasably holding a end tool 80. A proximal end of stick 60 is attached to a distal end of linkage arm 55 such that members 60 and 55 are mutually pivotable.

Boom assembly 30 includes four main pivots: first pivot 56*a*, second pivot 56*b*, third pivot 76*a*, and fourth pivot 76*b*. The pivot connections at the proximal and distal portions or ends of boom 50 are pivots 56*a* and 56*b*. First pivot 56*a* connects together the proximal end of boom 50 and the lower end of the proximal linkage 45 and/or a proximal portion of counterweight 40. Second pivot 56*b* connects together the distal end of boom 50 and an intermediate point of stick 60.

The pivot connections at the proximal and distal portions or ends of linkage arm 55 are third and fourth pivots 76*a* and 76*b*. Third pivot 76*a* connects together the proximal end of linkage arm 55 and the upper end of the proximal linkage arm 45 and/or distal portion of counterweight 40. Fourth pivot 76*b* connects together a distal end of linkage arm 55 and an upper end of stick 60. A proximal or upper portion 62 of stick 60 is defined between pivot 56*b* and the pivot 76*b*. And a distal or lower portion 64 of stick 60 is defined between the intermediate point at second pivot 56*b* and adapter 68. A four-bar linkage 70, which is preferably a planar four-bar linkage, is formed by the combination of boom 50, linkage arm 55, proximal linkage 45, upper portion 62 of stick 60, and pivots 56*a*, 56*b*, 76*a*, and 76*b*.

An actuator, such as second hydraulic cylinder 58 (shown with a dashed lead line in FIGS. 1 and 2 to indicate that cylinder 58 is omitted from the figures for clarity), is operatively attached between a fixed portion of base 20 and a proximal linkage arm 45 and/or portion of counterweight 40. First and second cylinders 48 and 58 act on arms of four-bar linkage 70 to enable boom assembly 30 to position end tool 80 at any combination of radial distance D2 from base 22 and height H1 or H2 above slag 98 or scrap 99. For clarity and convenience of illustration, FIGS. 1 and 2 schematically illustrate slag 98 and scrap 99 with one icon—it is understood that the icon may represent a slag pit, separate stockpiles of slag 98 and scrap 99, a mixed stockpile of slag and scrap, and any other combination.

Radial distance D1, which represents a measure of the moment arm applied by counterweight 40, may also be controlled. The control and operation of cylinders 48 and 58 and thus the manipulation and positioning of the four-bar linkage 70 and end tool 80 will be understood by persons familiar with equilibrium cranes. Further, radial dimension D1 (as well as other operating parameters) may be saved in the memory of a control system 90 as a reference point, as explained more fully below.

Adapter 68 and end tool 80 are shown schematically in FIGS. 1 and 2. Adapter 68 preferably employs conventional technology for releasably coupling end tool 80 to the proximal end of stick 60. Adapter 68 may be an OilQuick Quick Coupler, available from OilQuickUSA, or like product. Many adapters 68 are hydraulically actuated and other means for actuating adapter 68 are contemplated. Adapter 68 can be affixed to the distal end of stick 60 to engage and then disengage any of the tools without an operator physically touching any of the end tools or adapter 68 (that is, hands-free operation). A corresponding fixture for mating to adapter 68 may be affixed to each one of the end tools 80 such that each of the end tools 80 may be readily engaged by the quick connect coupling 68 when it is desired for the end tool 80 to be employed. Thus, the end tools 80 are interchangeable. Adapter 68 may also have a rotating or tilting feature.

Figure 5:
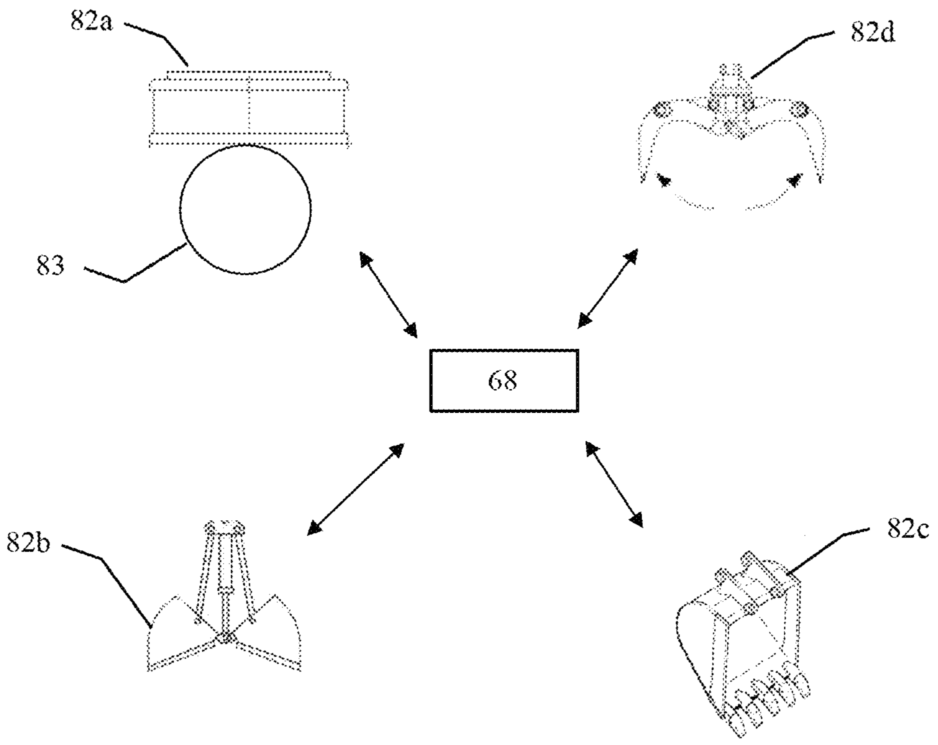
FIG. 5 is a diagram illustrating the quick connect adapter capability to engage and disengage a ball-drop system, a clamshell bucket, a bucket, and a grapple.

As illustrated partially schematically in FIG. 5, end tool 80 may be any of a combination of drop-ball fixture 82*a* and a drop-ball 83, a clamshell bucket 82*b*, a conventional bucket 82*c*, a grapple 82*d*, or like working device suitable for usage with slag or scrap. The drop-ball fixture 82*a* preferably is a conventional electromagnet that is designed together with a large drop-ball 83 such that ball 83 can be raised and positioned by boom assembly 30 and then released such that the ball 83 drops onto a desired location, especially onto scrap 99, thereby reducing the size of the scrap 99. The term "drop-ball" as understood in the scrap processing industry is a large steel spheroid or other shape that when not attached to the electromagnet is loose—that is, not attached by a cable. Typically, a drop-ball is between 2,000 and 30,000 pounds, although the weight range is not a requirement. Nor is the term "drop ball" limited to a ball shape, as other shapes may be employed. Further, the drop-balling operation is not limited to being applied only to scrap 99, but may also be deployed on slag 98 or a mixture of slag and scrap.

An operator may be housed in an operator or control station 24 on or affixed to support base 22. For example, a control station 26 may be located at an elevated position on fixed pedestal 24*a* to aid the operator in seeing the surrounding ground and crane system 10, thereby promoting safety and effectiveness of the operation. For example, elevating the operator control station 26 by affixing it to or at the upper end of pedestal 24*a* or upper portion of other structure can provide a line of sight for an operator to the scrap while keeping a safe distance from the slag pit, which can diminish the chance of injury such as from an explosion or other slag-pit phenomena or such as flying scrap during drop-balling. A control station 26 may be located at an elevated position on crawler 24*b* or rail and carriage system 24*c* that also promotes safety and effectiveness. Alternatively, an operator control station 26 may be located remotely relative to crane system 10 at, for example, a location at which an operator may remotely control additional machinery or operations. Further, the operator control station may be omitted in some circumstances, such as upon automated control and/or AI of the crane system 10.

In operation, crane system 10 includes a control system 90 for operating and positioning crane 10 as needed relative to slag 98 or scrap 99, which is illustrated schematically in FIGS. 1 and 2. Preferably, control system 90 enables moving the support base 22 according to known procedures associated with the type of moveable means chosen, such as crawler 24*b* or rail and carriage system 24*c*. Control system 90, among other operations, actuates hydraulic cylinders 48 and 58 to engage four-bar linkage 70 such that counterweight 40 is effective to continuously balance the weight of crane system 10 forward of main pivot 32 and at least a portion of the operating load on end tool 80.

As an example of the operation of crane 10, clamshell 82*b* or other appropriate tool is capable of digging slag 98 from a slag pit and for loading slag 98 into a haul truck. The inventor is not aware of any use of an equilibrium-type crane for digging slag from a slag pit. When it is desired for crane 10 to operate on scrap 99, a clam shell 82*b* may be decoupled from the end of stick 60 and grapple 82*d* may be coupled to the end of crane 10, such as at an end of stick 60, preferably using hands-free adapter 68.

For a drop-ball operation, the grapple 82*a* (or other tool) may be detached from crane 10 and an electromagnet 82*a* then be affixed to crane 10, preferably by employing adapter 68. An operator via control system 90 actuates hydraulic cylinders 48 and 58 to position the drop-ball 83 over a desired target scrap 99 and elevate drop-ball 83 to an effective height H2, as illustrated in FIG. 2. Upon appropriate positioning, an operator may manually disengage ball fixture 82*a* (such as by sending an electrical signal to electromagnet 82*a* to release the drop-ball) such that ball 83 falls on scrap 99. Control system 90 may store the position of the end of stick 60/magnet 82*a* at which drop-ball 83 is released, including the height above ground or other reference point, and the x-y coordinates or angular position (not shown in the figures) of boom 50 and dimension D1. The position (expressed in x-y-z or polar coordinates) of electromagnet 82*a* or other reference point on or relative to crane 10 at which drop-ball 83 is released is referred to as the drop position.

After releasing the drop ball 83, if an operator determines that another iteration of drop-balling is needed, the operator via control system 90 may position electromagnet 82*a* to engage ball 83 resting on the ground and/or on scrap 99 and then via the controls lifts ball 83 to return it to the prior drop position or to a new drop position. The prior drop ball position stored by the control system may be used by the operator to crane system 10 to the prior drop position or to determine a new drop position based on a prior drop position. For example, a new drop position may be assessed based on an operator's visual assessment of the effectiveness of one or more prior drop-ball iterations such that the new drop position may change in an x-y plane (for example, defining a horizontal plane) relative to the prior drop position to target specific regions of the pile of scrap 99 and/or may increase or decrease height H2 (that is, a z dimension) above scrap 99 relative to the prior drop position. When the desired drop position is achieved, the drop-balling process may be repeated by releasing ball 83 from electromagnet 82*a*. Multiple iterations of dropping drop-ball 83 onto scrap 99 are usually desired and performed.

To aid in the drop-ball operations, control system 90 may include the capability to automate all or portions of the drop-balling process. For example, control system 90 may include a vision system and/or sensors to aid in the moving and positioning of electromagnet 82*a* (via actuators described herein) relative to ball 83 when ball 83 is on the ground and/or on scrap 99. Electromagnet 82*a* may energize to engage ball 83 in response to a signal from a control algorithm and/or may be moved to a position relative to ball 83 according to a control algorithm and then alert an operator for manual operator actuation of electromagnet 82*a*. An algorithm of control system 90 may also be employed to automatically move crane system 10 to the prior drop position and/or calculate a new drop position based on input from a machine vision system, position sensor system, and/or an operator. Release of ball 83 when crane system 10 is in the drop position may be wholly automated, partly automated (such as alerting an operator for manual actuation of the electromagnet 82*a*, or wholly controlled by the operator. The controls, sensors, and algorithms may be chosen according to the desired capabilities of crane system 10 as will be understood by persons familiar with controlling industrial machinery and/or robotics.

The impact of drop-ball 83 dropping on scrap 99 breaks the scrap into smaller pieces, which is referred to as reducing the size or average size of scrap 99. In this regard, the phrase "size reduction" and related phrases refer only to breaking masses of scrap into pieces, without regard to how the size of the pieces or particles is measured, as will be understood by persons familiar with mineral or scrap processing.

An operator may decide to halt or pause the drop-balling operation when at least a portion of the scrap 99 has been reduced sufficiently in size in a desired quantity, as desired or specified by the transport or melt capabilities. Then crane system 10 may be put into a position on or near the ground such that that the ball release fixture 82*a* and ball 83 may be disengaged from the connection adapter 68, such as by engaging the hydraulic system of adapter 68 to release the quick connect coupling from the corresponding feature on the drop-ball fixture 82*a*. The crane assembly 10, then free of any end tool 80, may be positioned by the operator to engage another one of the end tools 80. After the scrap is broken to the desired size, it's loaded into a haul truck or scrap box for transport by a terminal tractor. (specially designed steel mill equipment).

For example, if the operator chooses to employ a grapple 82*d*, boom assembly 30 may be positioned such that adapter 68 engages the corresponding feature on grapple 82*d* to attach grapple 82*d* to the distal end of stick 60. Then grapple 82*d* may be operated to grasp portions of slag 98 and move slag 98 to dump it into a truck, conveyor, hopper, barge, or other desired location or means. In some circumstances, the operator may position electromagnet 82*a* on or close to scrap 99 to engage and lift scrap 99, thus use electromagnet 82*a* to both lift ball 83 to reduce the size of scrap 99 and also to lift and transport scrap 99 as needed. The process of positioning the end tool 80 on or near the ground, releasing the tool 80 via actuation of adapter 68 and engaging another one of the end tools 80 may apply to any one of the drop-ball magnet 82*a*, clamshell bucket 82*b*, bucket 82*c*, and grapple 82*d*, as determined by the operator.

Another method of applying the technology of crane system 10 includes using a mechanical gripper, such as a grapple 82*e*, to grasp and lift a weight, such as a ball 83', to preform both drop-balling operations and grasping and moving operations. In this regard, the grapple in FIG. 6 is given reference number 82*e* to indicate that it may have a different structure or configuration (such as number, spacing, and size of the fingers, and like factors) than that of gripper 82*d*; the ball in FIG. 6 is given a different reference number to indicate that it may have a different structure or configuration (such as flats or the like to aid in gripping by the grapple) that than of ball 83.

Figure 6:
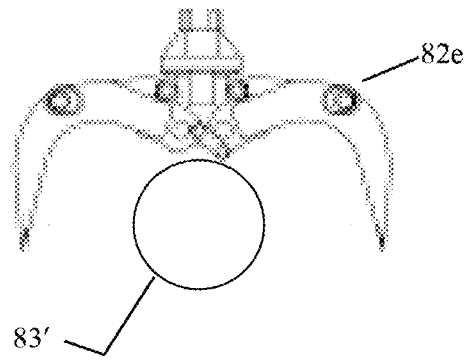
FIG. 6 is a partial, schematic view illustrating another inventive aspect.
Figure 7:
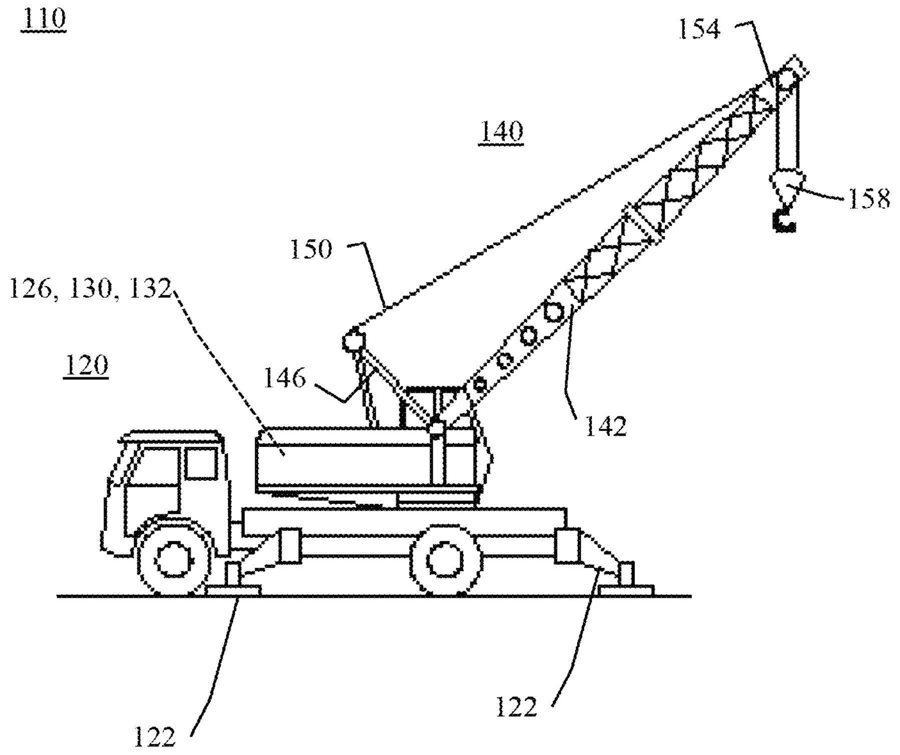
Figure 7 (Prior Art)
FIG. 7 (Prior Art) is a conventional truck mounted art lattice and cable-type crane.

For an example of the operation of the system schematically shown in FIG. 6, crane system 10 may position grapple 82*e* having ball 83' over scarp 99, then release ball 83' by disengaging or retracting the fingers of grapple 82*e*. After ball 83' falls onto scrap 99, control system 90 may be used to move grapple 82*e* to position grapple 82*e* relative to ball 83'. The fingers of 83' may then be engaged or closed about ball 83' for lifting ball back to the prior drop position or a new drop position according to the principles described herein. After an operator and/or control system 90 determines that the scrap 99 (or a portion thereof) has been sufficiently reduced in size, the grapple 82*e* (without ball 83') may be moved into position relative to scrap 99 to grasp at least a portion of scrap 99 and lift and transport it to a desired location, as described more fully herein.

In general, control system 90 may position and orient of crane 10 in many ways through actions of a human operator and/or an algorithm. Optical sensors, contact sensors, proximity sensors, strain sensors, and the like may be disposed on or around crane system 10, and sensors of conventional crane technology, such as hydraulic pressure and temperature and the like, may be employed. A vision system may be employed, as will be understood by persons familiar with automated control of cranes and like industrial equipment in view of the present specification. Data from a vision system (such as from stored images) and/or sensors/cameras may be used in positioning and orienting crane system 10 to a drop position, in assessing whether the drop-balling process is complete, in determining a new drop position, in positioning and orienting crane system 10 to a position for exchanging end tools, in determining the choice of tool to be engaged, and like operations.

Where automated, control system 90 may use data for drop-ball iterations and/or grasping operations (such as grasping and moving slag 99 with a clamshell) that have been successful or unsuccessful in prior operations. For example, data from prior drop-ball iterations and/or grasping operations may be employed by the control system 90 to recommend parameters of the next operation to the operator or to initiate the next operation automatically. Thus, control system 90 may employ machine learning based on data from any source.

Control system 90 may employ one or more network for exchanging data. The data network can be the internet or other public network, or an intranet or virtual private network or other private data network. Data may be exchanged via any means, such as wirelessly or wired, regardless of the communication protocols.

As used herein, the terms "equilibrium-type" and "balance-type," and related terms, refer to an industrial, large-scale lifting device that includes a counterweight on the opposite side of a pintle or post from a stick that is capable of lifting a weight. The counterweight balances the weight of the crane structure on the opposing side of the post and preferably a portion of the intended operational load. Conventional equilibrium-type crane equipment is commercially available from E-Crane International USA and Sennebogen LLC, as will be understood by persons familiar with crane technology, equipment, and processes. As used herein, the term "pit" is broad such that it includes a hole dug into the ground, the side of a slope, and even level ground that receives molten slag. Slag pit and dumping station are synonyms.

Examples of the structure and function of the crane system are disclosed herein illustrate aspects of the present invention. For example, a balance-type crane is illustrated as an example embodiment of some inventive concepts disclosed herein. But the present invention is not limited to the particular structure, function, and methods disclosed herein. For example, the present invention is not limited to a balance-type/equilibrium crane, as several inventive concepts disclosed herein do not require a balance-type/equilibrium crane. The specification explains other examples of structures that are employed to describe structure, functions, and methods relating merely to particular embodiments or aspects of the invention. Accordingly, it is intended that the claims be given their full scope according to their plain meaning.

I claim:

1. A system for handling and processing steel slag and/or steel scrap comprising:

a support base, wherein the support base includes a pedestal, rails, a crawler, or a barge;

an equilibrium-type crane assembly supported by the support base, the crane assembly including:

a boom that is supported by and pivotable on a main support pivot, the boom including a first pivot at a proximal end thereof and a second pivot at a distal end thereof;

an upper linkage arm including a third pivot at a proximal end thereof and a fourth pivot at a distal end thereof;

a stick that is connected to the upper linkage arm at the fourth pivot at a proximal end of the stick and is connected to the distal end of the boom at the second pivot;

a proximal linkage arm that is connected to the boom at the first pivot and that is connected to the upper linkage arm at the third pivot; the stick, the upper linkage arm, the proximal linkage arm, and a portion of the boom forming a four-bar linkage;

an actuator system adapted for manipulating the four bar linkage in response to control signals a hydraulic quick-connect adapter located at a distal end of the crane assembly, and end-tools including at least a drop-ball tool, a clamshell bucket, a bucket, or a grapple that is adapted for at least one of digging slag from a slag pit and grasping scrap, wherein the drop-ball tool includes a magnet adapted for selectively lifting the drop-ball and upon reaching a desired height, disengaging the drop-ball from the magnet to enable the drop-ball to fall by gravity onto the scrap and/or slag;

wherein the quick connect coupling is adapted for releasing any one of the end-tools from the crane assembly and coupling another one of the end-tools with the crane assembly.

2. The system of claim 1 wherein the proximal linkage arm is integral with a counterweight.

3. The system of claim 1 further comprising an operator control station supported by the support base and elevated from the ground, thereby enhancing visibility by an operator.

4. The system of claim 1 further comprising a controller adapted for automatically returning the drop ball tool to a predetermined position relative to a prior position of release of the drop-ball.

5. A method of handling co-products of steel-making, including slag and/or scrap, comprising the steps of:

a. positioning a cableless crane assembly proximate a slag pit;

b. actuating an end-tool and thereby digging slag from the slag pit;

c. after the steps of actuating the end-tool and the step (b) of digging the slag, depositing the slag at a desired location;

d. lifting a drop-ball coupled by the crane assembly and positioning the drop-ball over scrap;

e. after the step (d) of lifting the drop-ball, releasing the drop-ball from the crane assembly from a drop position such that the drop-ball falls onto the scrap to produce a reduced-size portion of the scrap; and f. after the step (e) of releasing the drop-ball, moving the crane assembly to re-engage the drop-ball with the crane assembly and lifting the drop-ball.

6. The method of handling co-products of steel-making of claim 5 further comprising the step of engaging a controller to position the drop-ball at or near the drop position and then releasing the drop-ball from the crane assembly.

7. The method of handling co-products of steel-making of claim 5 wherein the step (b) of digging the slag pit includes grasping the slag with a grapple; the step (d) of lifting the drop ball includes closing fingers of the grapple to grasp the drop ball, and the step (e) of releasing the drop ball includes opening the fingers of the grapple to enable the releasing of the drop ball.

8. The method of handling co-products of steel-making of claim 5 wherein the step (d) of lifting the drop ball includes energizing an electromagnet releasably affixed to a stick of the crane assembly, and wherein the step of releasing the drop-ball includes releasing the drop ball from the electromagnet.

9. The method of handling co-products of steel-making of claim 8 further comprising the step of selectively releasing and engaging the end-tool and the electromagnet with a quick-connect adapter connected to the stick of the crane assembly.

10. The method of handling co-products of steel-making of claim 9 wherein the step of selectively releasing and engaging the end-tool includes the steps of:

positioning the end-tool on or near the ground and releasing the end-tool from the distal end of the stick of the crane assembly; and after the positioning and releasing steps, moving the crane assembly such that the quick connect adapter engages the electromagnet.

11. The method of handling co-products of steel-making of claim 5 wherein the step of lifting the drop ball (d) includes grasping the drop-ball with the end-tool, wherein the end-tool is a grapple.

12. The method of handling co-products of steel-making of claim 5 wherein the step (a) of positioning the cableless crane assembly proximate the slag pit and the step (b) of actuating the end-tool include actuating a four-bar linkage of the crane assembly and activating a pair of hydraulic cylinders to move the four-bar linkage.

13. The method of handling co-products of steel-making of claim 5 wherein the step (a) of positioning the crane includes moving the crane assembly over the ground by one of a crawler and a rail and carriage system.

14. The method of handling co-products of steel-making of claim 5 wherein the step (a) of digging the pit includes employing one of a clamshell bucket, a bucket, and a grapple.

* * * * *